(12) United States Patent
Kubota et al.

(10) Patent No.: US 7,153,602 B2
(45) Date of Patent: Dec. 26, 2006

(54) FUEL CELL ASSEMBLY

(75) Inventors: Tadahiro Kubota, Wako (JP); Jun Sasahara, Wako (JP); Nariaki Kuriyama, Wako (JP); Yuji Isogai, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 165 days.

(21) Appl. No.: 09/850,401

(22) Filed: May 8, 2001

(65) Prior Publication Data

US 2002/0006539 A1    Jan. 17, 2002

Related U.S. Application Data

(60) Provisional application No. 60/202,827, filed on May 8, 2000, provisional application No. 60/242,136, filed on Oct. 23, 2000.

(51) Int. Cl.
*H01M 2/16*    (2006.01)
*H01M 8/10*    (2006.01)

(52) U.S. Cl. .......................................... 429/34; 429/38

(58) Field of Classification Search ................. 429/34, 429/38, 39; 427/34, 38, 39
See application file for complete search history.

(56) References Cited

U.S. PATENT DOCUMENTS 5,034,288 A * 7/1991 Bossel .......................... 429/32
5,910,378 A * 6/1999 Debe et al. .................... 429/42
6,245,453 B1 * 6/2001 Iwase et al. ................... 429/34
6,387,558 B1 * 5/2002 Mizuno et al. ................ 429/34
6,468,685 B1 * 10/2002 Yoshida ........................ 429/34
6,472,094 B1 * 10/2002 Nonoyama et al. ........... 429/34
6,528,199 B1 * 3/2003 Mercuri et al. ............... 429/40
6,589,682 B1 * 7/2003 Fleckner et al. .............. 429/34
6,689,439 B1 * 2/2004 Sobolewski ................ 428/36.9

FOREIGN PATENT DOCUMENTS

EP    0 330 124 A2    8/1989

* cited by examiner

*Primary Examiner*—Tracy Dove
(74) *Attorney, Agent, or Firm*—Arent Fox PLLC

(57) ABSTRACT

In a fuel cell assembly typically comprising a plurality of cells each comprising an electrolyte layer (2), a pair of gas diffusion electrode layers (3, 4), and a pair of flow distribution plates (5), each flow distribution plate is provided with a central recess (51, 52) having a number of projections (53, 54) formed therein; and an electrode terminal layer (55, 56) is formed on each projection to establish a connection with an external circuit; each gas diffusion electrode layer defining the passages for fuel and oxidizer gases by covering the central recess, and provided with a porous layer (3a, 4a) typically in the form of a nano-tube carbon film, formed over each flow distribution plate. Because the porous layer is directly formed on each flow distribution plate, the thickness of each gas diffusion electrode layer can be freely controlled, and the overall thickness of the assembly can be minimized so as to allow a compact design.

3 Claims, 5 Drawing Sheets

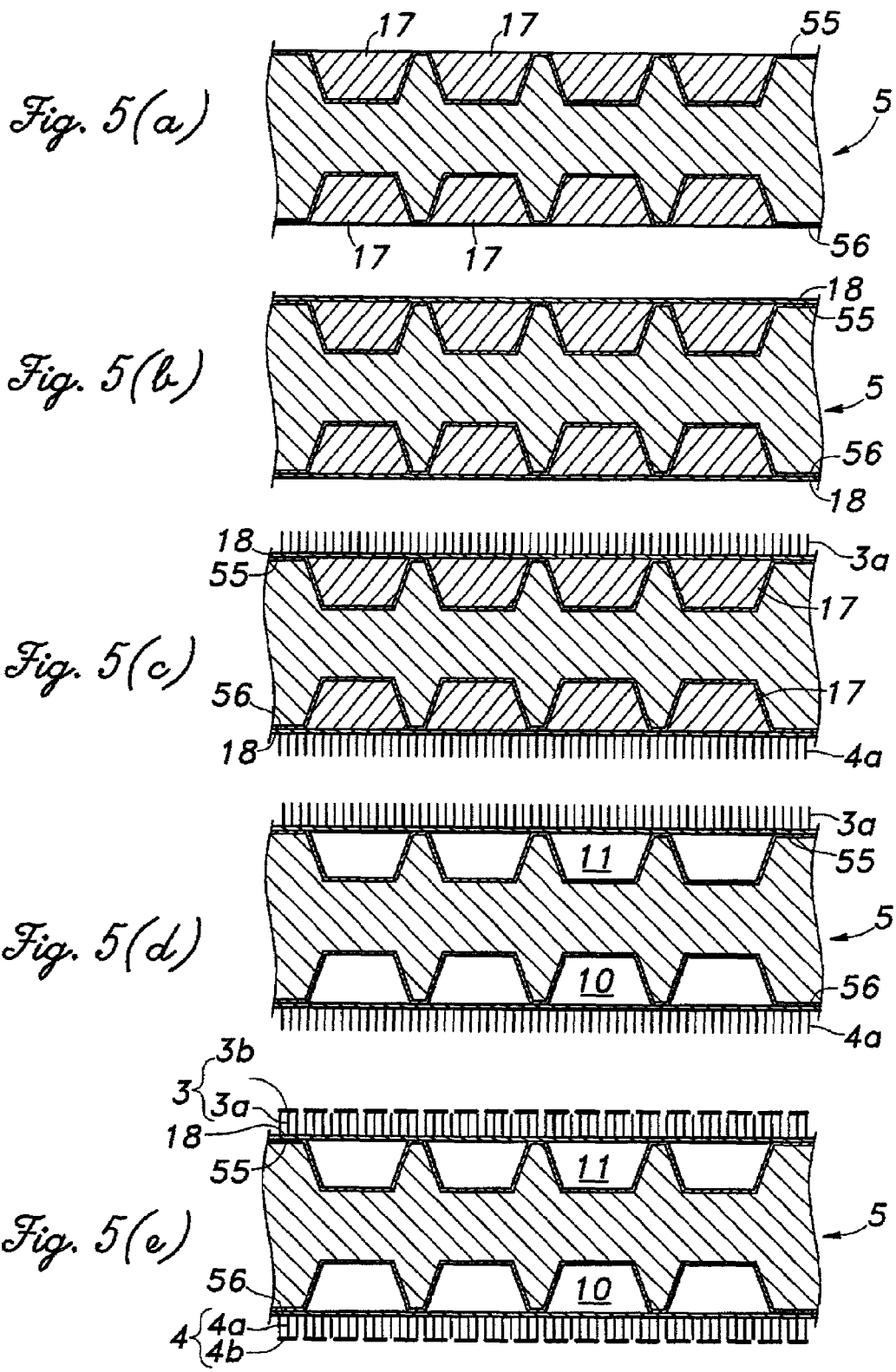

FUEL CELL ASSEMBLY

This application claims the benefit of U.S. Provisional Application Nos. 60/202,827, filed May. 8, 2000, and 60/242,136, filed Oct. 23, 2000, both of which are herein incorporated by reference.

TECHNICAL FIELD

The present invention relates to a fuel cell assembly typically comprising a plurality of fuel cells each including an electrolyte layer, a pair of gas diffusion electrode layers placed on either side of the electrolyte layer, and a pair of flow distribution plates placed on either outer side of the gas diffusion electrode layers to define passages for distributing fuel gas and oxidizing gas in cooperation with the opposing surfaces of the gas diffusion electrode layers.

BACKGROUND OF THE INVENTION

A fuel cell comprises an electrolyte layer and a pair of electrodes placed on either side of the electrolyte layer, and generates electricity through an electrochemical reaction between fuel gas such as hydrogen and alcohol and oxidizing gas such as oxygen and air, which are supplied to the corresponding electrodes, with the aid of a catalyst. Depending on the electrolytic material used for the electrolyte layer, the fuel cell may be called as the phosphoric acid type, solid polymer type or molten carbonate type.

In particular, the solid polymer electrolyte (SPE) type fuel cell using an ion-exchange resin membrane for the electrolyte layer is considered to be highly promising because of the possibility of compact design, low operating temperature (100° C. or lower), and high efficiency.

The SPE typically consists of an ion-exchange resin membrane made of perfluorocarbonsulfonic acid (Nafion: tradename), phenolsulfonic acid, polyethylenesulfonic acid, polytrifluorosulfonic acid, and so on. A porous carbon sheet impregnated with a catalyst such as platinum powder is placed on each side of the ion-exchange resin membrane to serve as a gas diffusion electrode layer. This assembly is called as a membrane-electrode assembly (MEA). A fuel cell can be formed by defining a fuel gas passage on one side of the MEA and an oxidizing gas passage on the other side of the MEA by using flow distribution plates (separators).

Typically, such fuel cells are stacked, and the flow distribution plates are shared by the adjacent fuel cells in the same stack. When forming such a stack, it is necessary to seal off the passages defined on the surfaces of the MEAs from outside. Conventionally, gaskets were placed in the periphery of the interface between each adjoining pair of a MEA and a distribution plate. The contact area between the MEA and the gas diffusion electrode was ensured by pressing them together by applying an external force, typically with the aid of a suitable fastener. The required electric connection between the gas diffusion electrode and an electrode terminal connected to an external circuit was also ensured by pressing them together by applying an external force.

However, because the material used for the gas diffusion electrode, such as a carbon sheet, has surface irregularities, and the electrode terminal for connection with an external circuit is allowed to contact the gas diffusion electrode while providing flow paths for the fuel and oxidizer, the contact area between them is very much limited. Also, the SPE can function as an ion-exchange membrane only when impregnated with water, and the SPE when impregnated with water significantly changes its volume depending on the temperature. The flow distribution plates also expand and contract according to the temperature. The resulting stress affects the pressure that is applied to the fuel cell, and this prevents an accurate control of the pressure acting between the different layers of the fuel cell. In particular, it tends to prevent a reliable electric contact to be established between the electrode terminal and the gas diffusion electrode.

The carbon sheet is preferred as the material for the gas diffusion electrode, but cannot be made as thin as desired (in the order of a few μm) in view of the handling. This tends to undesirably increase the thickness of each fuel cell. Also, the carbon sheet is required to be porous, but the catalyst in the form of fine powder tends to fill the pores of the carbon sheet. Such a loss of porosity of the carbon sheet reduces the diffusion rate of the fuel gas and oxidizer gas which in turn reduces the efficiency of the device.

BRIEF SUMMARY OF THE INVENTION

In view of such problems of the prior art, a primary object of the present invention is to provide a fuel cell assembly which can ensure a favorable electric connection between the gas diffusion electrode and the electrode terminal for external connection at all times.

A second object of the present invention is to provide a fuel cell assembly which can ensure a low electric contact resistance between the gas diffusion electrode and the electrode terminal while allowing unhampered gas diffusion so that a high efficiency of the device may be ensured.

A third object of the present invention is to provide a fuel cell assembly which is suitable for compact design.

A fourth object of the present invention is to provide a fuel cell assembly which is easy to manufacture.

According to the present invention, such objects can be accomplished by providing a fuel cell assembly at least one cell comprising an electrolyte layer, a pair of gas diffusion electrode layers interposing the electrolyte layer between them, and a pair of flow distribution plates for defining passages for fuel and oxidizer gases that contact the gas diffusion electrode layers, characterized by that: each flow distribution plate is provided with a central recess having a number of projections formed therein; and an electrode terminal layer is formed on each projection to establish an electric connection with an external circuit; each gas diffusion electrode layer defining the passages for fuel and oxidizer gases by covering the central recess, and provided with a porous layer formed over each flow distribution plate so as to cover the electrode terminal layer.

Because the porous gas diffusion electrode layers cover the electrode terminal layers on each distribution plate, a low electric contact resistance can be ensured between the electrode terminal layers and the gas diffusion layers without applying any external pressure. Because the porous gas diffusion electrode layers are formed directly over the surfaces of the flow distribution plates, the thickness of each diffusion electrode layer can be controlled at will, and this contributes to a compact design. Also, because each gas diffusion electrode layer essentially consists of a carbon film such as carbon nano-tube which has numerous fine through holes across its thickness, it can offer a substantially larger surface area than a comparable solid carbon sheet.

BRIEF DESCRIPTION OF THE DRAWINGS

Now the present invention is described in the following with reference to the appended drawings, in which:

FIGS. 5a to 5e are sectional views of the gas diffusion electrodes in different steps of the fabrication process.

DETAILED DESCRIPTION OF THE PREFERRED EMBODIMENTS

Figure 1:
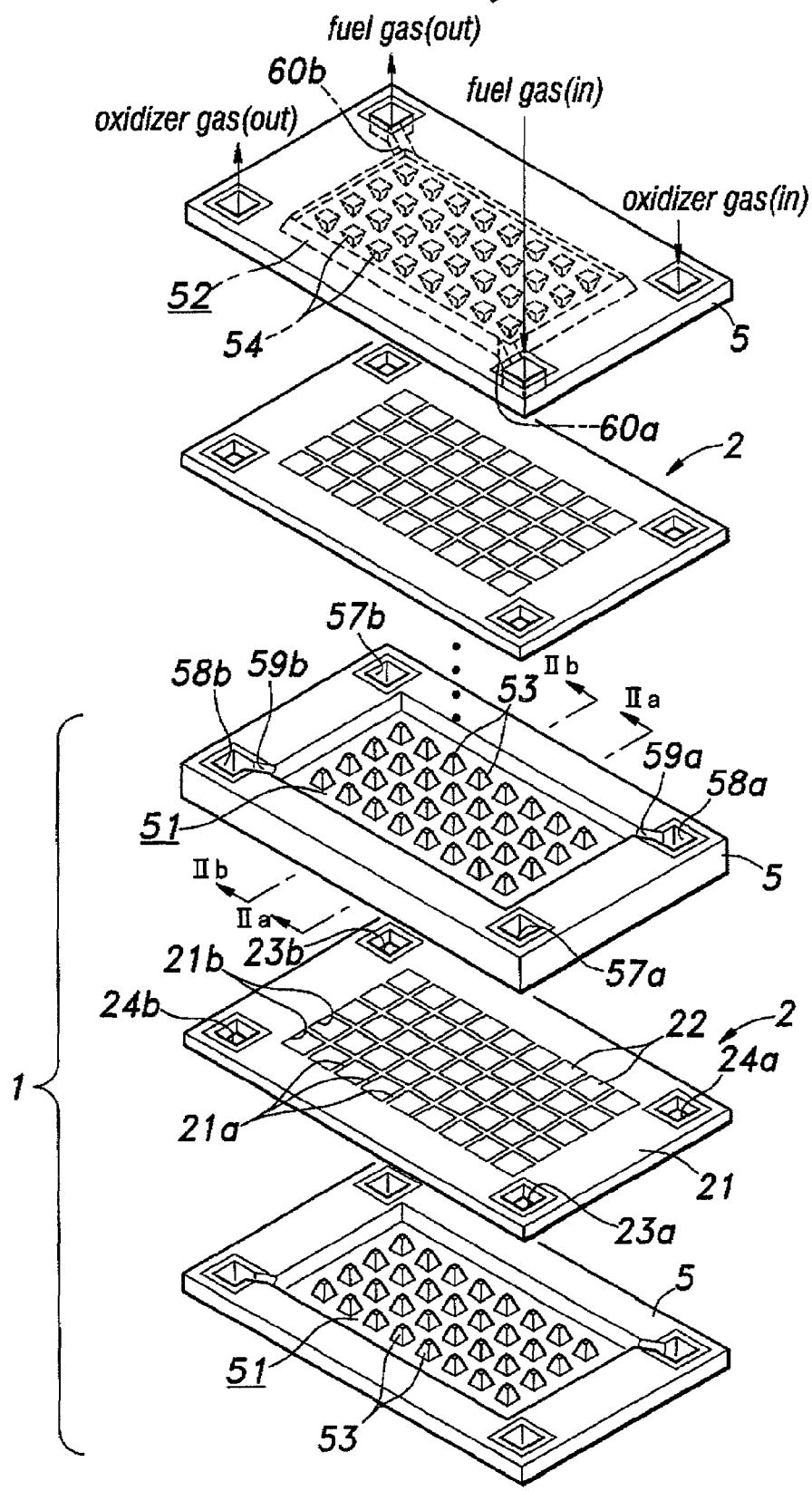
FIG. 1 is an exploded perspective view of a part of a fuel cell assembly embodying the present invention.

FIG. 1 shows the structure of a part of a fuel cell assembly embodying the present invention. In practice a plurality of cells are formed into a stack, and a number of such stacks are connected in series and/or parallel, and fuel consisting of reformed alcohol, hydrogen gas or the like is supplied to each fuel cell stack along with oxidizing gas such as air.

Figure 2A:
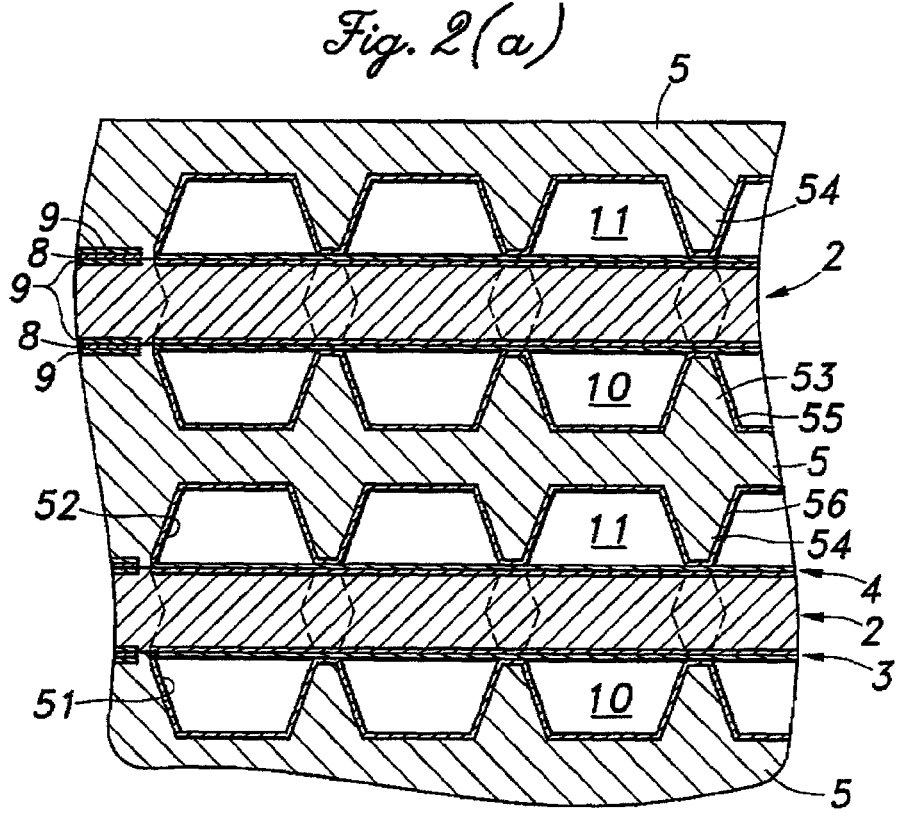
FIG. 2a is a sectional view taken along line IIa—IIa of FIG. 1.
Figure 2B:
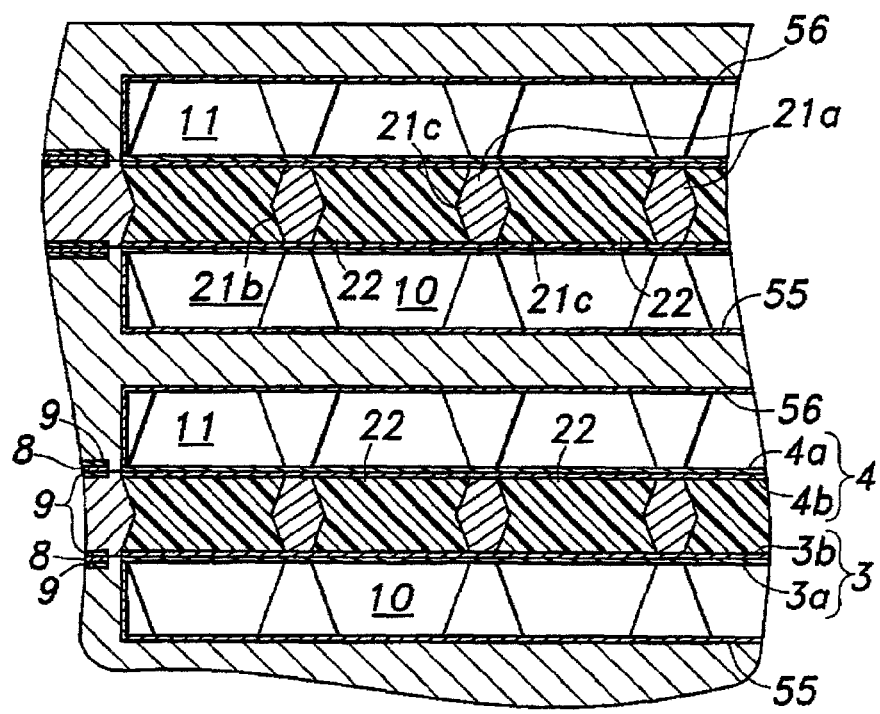
FIG. 2b is a sectional view taken along line IIb—IIb of FIG. 1.

Referring also to FIGS. 2a and 2b, each fuel cell 1 comprises a central electrolyte layer 2, a pair of gas diffusion electrode layers 3 and 4 (see FIGS. 2a and 2b) placed on either side of the central electrolyte layer 2, and a pair of flow distribution plates 5 placed on either outer side of the gas diffusion electrode layers 3 and 4. The outer side of each flow distribution plate 5 is similarly formed as the inner side thereof so as to serve as the flow distribution plate for the adjacent fuel cell.

The electrolyte layer 2 comprises a grid frame 21, and solid polymer electrolyte (SPE) 22 which is filled into rectangular through holes 21b define between adjacent bars 21a of the grid frame 21. The SPE 22 may be made from such materials as perfluorocarbonsulfonic acid (Nafion: tradename), phenolsulfonic acid, polyethylenesulfonic acid, polytrifluorosulfonic acid, and so on.

The grid frame 21 is formed by etching or otherwise working a silicon wafer, and is provided with a rectangular and annular fringe portion and a rectangular grid area defined inside the annular fringe portion. Each bar 21a in the grid area of the grid frame 21 is provided with a projection 21c at an intermediate part thereof so as to project into an intermediate part of the corresponding through hole 21b as best shown in FIGS. 2a and 2b. The projection 21c is in the shape of a ridge extending along the length of the bar 21a, and produces a narrower middle part in each through hole 21b. The projection 21c helps to retain the SPE 22 in each through hole 21b.

Figure 3A:
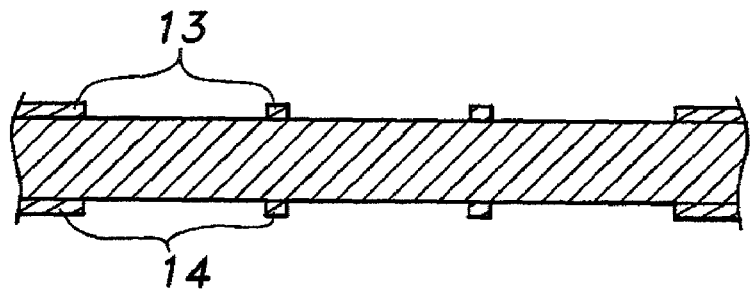
FIGS. 3a to 3c are sectional views of the electrolyte layer in different steps of the fabrication process.
Figure 3B:
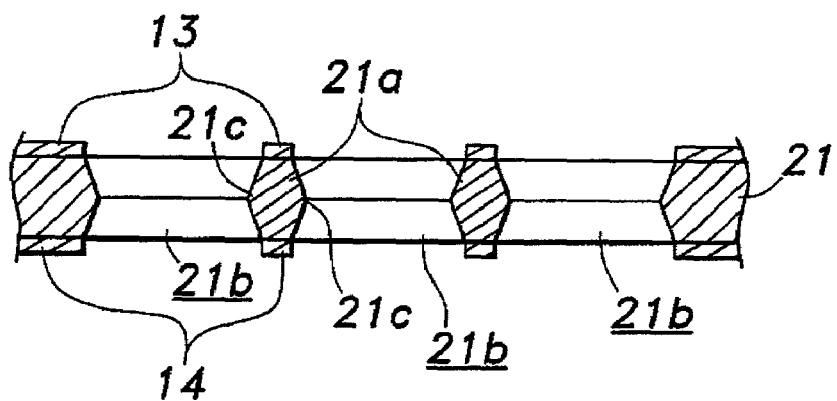
Figure 3C:
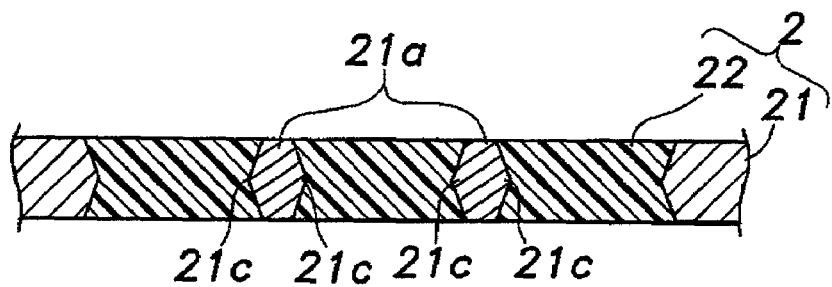

Such a projection can be conveniently formed at the same time as forming the grid frame 21. FIGS. 3a to 3c illustrate the process of forming the electrolyte layer 2. First of all, a suitably patterned photoresist layer 13 and 14 is placed on each side of a silicon wafer serving as the material for the grid frame 21 as shown in FIG. 3a. An anisotropic etching is performed from both sides of the wafer as illustrated in FIG. 3b, and this produces a plurality of through holes 21b each of which is narrowed in a middle part by a projection 21c. Then, SPE 22 is filled into each of the through holes 21b so as to define a substantially flush planar surface on each side of the electrolyte layer 2.

In this embodiment, a rectangular through hole 23a, 23b, 24a and 24b is formed in each corner portion of the fringe portion of the grid frame 21. One of the diagonally opposing pairs of these through holes 23a and 23b serve as inlet and outlet for the full gas. The remaining opposing pair of these through holes 24a and 24b serve as inlet and outlet for the oxidizing gas.

Each flow distribution plate 5 is also formed by working a silicon wafer, and has a substantially conformal rectangular shape. A rectangular recess 51 or 52 having a flat bottom is formed centrally on each side of the flow distribution plate 5, and a plurality of projections 53 or 54 each having the shape of a truncated pyramid are formed on the flat bottom. The surface of the recesses and the projections are coated with a gold plate layer serving as an electrode terminal layer 55 or 56 by suitable means for electrically connecting the gas diffusion electrode layers 3 and 4 to an external circuit.

Figure 4A:
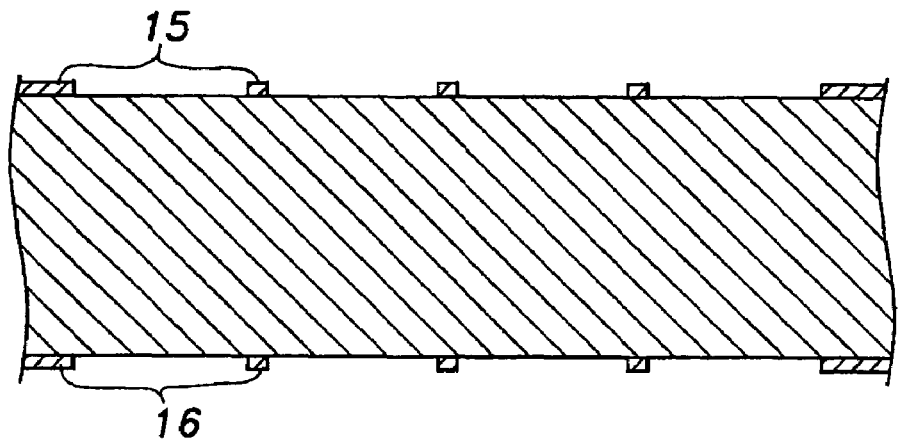
FIGS. 4a to 4c are sectional views of the flow distribution plate in different steps of the fabrication process.
Figure 4B:
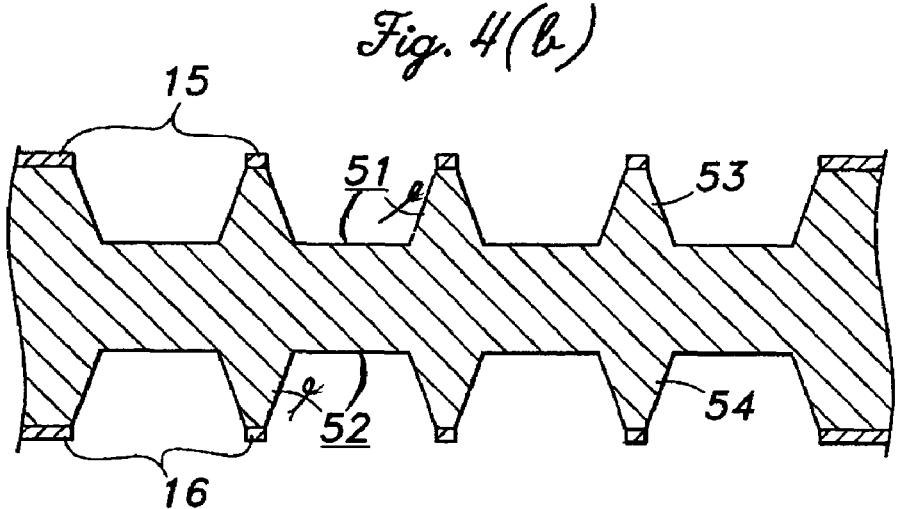
Figure 4C:
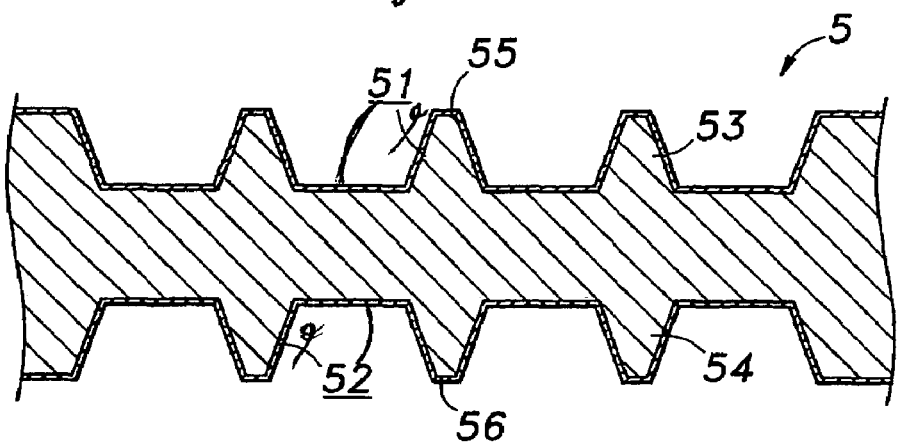

FIGS. 4a to 4c show the process of forming each flow distribution plate 5. A suitably patterned photoresist layer 15 and 16 is formed on each side of a silicon wafer as shown in FIG. 4a, and the silicon wafer is etched from both sides to form the recesses 51 and 52 and projections 53 and 54 at the same time as shown in FIG. 4b. The distribution plate 5 on the upper end or lower end of each fuel cell stack may be provided with a recess and projections only on inner side thereof. Thereafter, electrode terminal layer 55 and 56 is formed over the surface of the recesses 51 and 52 and projections 53 and 54 as shown in FIG. 4c.

The distribution plate 5 is conformal to the grid frame 21, and therefore has a rectangular shape. A rectangular through hole 57a, 57b, 58a or 58b is formed in each corner portion of the fringe portion thereof. One of the diagonally opposing pairs of these through holes 57a and 57b serve as inlet and outlet for the fuel gas. The remaining opposing pair of these through holes 58a and 58b serve as inlet and outlet for the oxidizing gas. As shown in FIG. 1, grooves 59a and 59b formed in the fringe portion communicate the recess 51 with the through holes 58a and 58b for the oxidizing gas, and similar grooves 60a and 60b communicate the recess 52 with the through holes 57a and 57b for the fuel gas.

Each gas diffusion electrode layer 3 and 4 is formed in a plane passing through the free ends of the corresponding projections 53 and 54, and comprises a gas diffusion layer 3a and 4a formed by a porous carbon film having minute holes extending across its thickness (carbon nano-tube: see Langmuir, Vol. 15, No. 3, 1999, pp 750–758, American Chemical Society), and a platinum catalyst layer 3b and 4b formed as a porous layer placed on the surface thereof facing the electrolyte layer 2.

FIGS. 5a to 5e show the process of forming each gas diffusion layer 3 and 4. First of all, a flow distribution plate S is formed according to the process illustrated in FIGS. 4a and 4c. The recesses 51 and 52 are each filled with a sacrificial material 17 so as to define a flush outer surface with this sacrificial material 17 and the electrode terminal layer 55 and 56 on the top regions of the projections 53 and 54. Alternatively, the sacrificial material 17 may be deposited to such an extent as to entirely bury the projections 53 and 54 therein, and etched back until a flush outer surface is defined with this sacrificial material 17 and the electrode terminal layer SS and 56 on the top regions of the projections 53 and 54 (FIG. 5a). An iron or nickel layer 18 is formed on each outer surface of this assembly (FIG. 5b). Then, a carbon layer is deposited on the entire surface of the assembly by CVD at 600° C., for instance, and a carbon nano-tube film (gas diffusion layers 3a and 4a) is grown thereon at 300 to 600° C. under an atmospheric condition (FIG. 5c). In this step, a part of the carbon fails to grow into fibers. The part of the carbon which has failed to turn into fibers including that which has only partially grown into fibers is removed by adding oxygen. The sacrificial material 17 is removed by using hydrogen fluoride (HF) to define the air passages 10 and the fuel gas passages 11 (FIG. 5d). At the same time, the iron or nickel layer 18 on the recesses 51 and 52 is also substantially entirely removed so that it would not hamper the diffusion of the gases.

A platinum catalyst layer 3b and 4b consisting of a porous film is deposited on the surface of each carbon nana-tube film 3a and 4a to a thickness in the range of 10 nm to 100 nm by sputtering or evaporation (FIG. 5e). Finally, a SPE layer made of similar material as the SPE 22 is formed over the entire surface of the assembly to a thickness in the range of 1 to 10 μm by spin-coating although it is not shown in the drawing.

In this manner, in each fuel cell, a pair of flow distribution plates 5 are placed on either side of an electrolyte layer 2 via a gas diffusion electrode layer 3 or 4, and these components are joined by anodic bonding along the parts surrounding the recesses. Therefore, a plurality of narrow passages 11 are defined in one of the central recesses 52 of each flow distribution plate 5 for the fuel gas, and a plurality of similar narrow passages 10 are defined in the other of the central recesses 51 of the flow distribution plate 5 for the oxidizing gas.

The SPE layer which is placed on the platinum catalyst layer 3b and 4b on the surface of each gas diffusion layer 3a and 4a facing away from the flow distribution plate 5 serves as a bonding agent, and this contributes to a favorable bonding between the platinum catalyst layer 3b and 4b and the SPE 22.

The adhesion between the grid frame 21 and the distribution plates 5 can be accomplished in a number of different ways. Preferably, anodic bonding is used as described in the following. An electrode layer 9 and a layer 8 of heat resistance and hard glass, for instance, made of Pyrex glass (tradename) are formed along the peripheral surface of the grid frame 21 of the electrolyte layer 2 on each side thereof by sputtering, and a similar electrode layer 9 is formed along the peripheral part of the opposing surface of the distribution plates 5. Then, with this assembly heated to about 400° C. at which sodium ions become highly mobile, an electric field is produced in the assembly so as to move ions. In the fuel cell assembly of the present invention, if the electrolyte consists of solid polymer, heating the entire assembly to the temperature of 400° C. may damage the solid electrolyte. Therefore, according to this embodiment, a heater (not shown in the drawing) is placed under the electrode layer 9 to selectively heat only the peripheral part of the flow distribution plates. The heater may consist of polycrystalline silicon sandwiched between insulating layers such as $Si_3N_4$ layers. If the electrode terminal layer 55 and 56 extend under the heater, the thermal efficiency of the heater will be impaired. Therefore, it is preferable to omit the electrode terminal layer 55 and 56 from under the heater.

The grid frame 21 and the distribution plates 5 are placed one over another, and compressed at a pressure of 100 $gf/cm^2$ to 2,000 $gf/cm^2$. Electric current is conducted through the polycrystalline silicon heater to locally heat the bonded area to a temperature in the order of 400° C. At the same time, a voltage in the order of 100 to 500 V is applied between the electrode layer 9 of the grid frame 21 and the electrode layer 9 of the distribution plate 5 for 10 to 30 minutes.

Alternatively, a bonding agent may be used for attaching the grid frame 21 and the distribution plates 5 together. In either case, it is possible to eliminate the need for any sealing arrangements or clamping arrangements to achieve a desired sealing capability, and this allows a compact design of the fuel cell assembly.

As the fuel gas and oxidizing gas (air) are conducted through this fuel cell 1, an electrochemical reaction takes places by virtue of the platinum catalyst, and an electric voltage develops between the electrode terminal layers 55 and 56. A number of such fuel cells are stacked so that a desired voltage can be obtained.

Although the fuel and oxidant for the fuel cells described herein consist of gases, they may also include liquids.

Although the present invention has been described in terms of preferred embodiments thereof, it is obvious to a person skilled in the art that various alterations and modifications are possible without departing from the scope of the present invention which is set forth in the appended claims.

The invention claimed is:

1. A fuel cell assembly including at least one cell comprising:
    an electrolyte layer;
    first and second gas diffusion electrode layers interposing the electrolyte layer between them;
    a first flow distribution plate placed on an outer side of the first gas diffusion electrode layer, the first flow distribution plate including a silicon substrate having a recess in a surface facing the first gas diffusion electrode layer and defining fuel gas passages for fuel gas that contacts the first gas diffusion electrode layer; and
    a second flow distribution plate placed on an outer side of the second gas diffusion electrode layer, the second flow distribution plate including a silicon substrate having a recess in a surface facing the second gas diffusion electrode and defining oxidizer passages for oxidizer gas that contacts the second gas diffusion electrode layer,
    wherein said recess of each of said first and second flow distribution plates is provided with a number of projections formed on a bottom of said recess,
    a first electrode terminal layer is formed on said projections of said first flow distribution plate for electrically connecting said first gas diffusion electrode layer to an external circuit,
    a second electrode terminal layer is formed on said projections of said second flow distribution plate for electrically connecting said second gas diffusion electrode layer to said external circuit,
    each of said first and second gas diffusion electrode layers comprises a porous layer covering said recess to define the passages for fuel and oxidizer gases, and
    said porous layer of each of said first and second gas diffusion electrode layers comprises a carbon nano-tube film,
    wherein said first and second electrode terminal layers each consist of gold.

2. A fuel cell assembly according to claim 1, wherein the carbon nano-tube film is grown on an iron or nickel layer formed on said electrode terminal layers.

3. A fuel cell assembly according to claim 1, wherein said first and second flow distribution plates and said electrolyte layer are held in a stacked structure by anodic bonding or a bonding agent.

* * * * *